United States Patent [19]

Peterson et al.

[11] Patent Number: 4,783,101
[45] Date of Patent: Nov. 8, 1988

[54] LOCKING ELEMENT

[75] Inventors: Francis C. Peterson, Woodbury; Daniel M. Zubik, Watertown, both of Conn.

[73] Assignee: Buell Industries, Inc., Waterbury, Conn.

[21] Appl. No.: 52,691

[22] Filed: May 20, 1987

[51] Int. Cl.[4] ............................................. F16L 37/12
[52] U.S. Cl. ................................... 285/319; 285/305; 285/315
[58] Field of Search ................. 285/39, 319, 314, 315, 285/421, 320, 321, 305

[56] References Cited

U.S. PATENT DOCUMENTS

| | | | |
|---|---|---|---|
| 1,820,703 | 8/1931 | Hungerford | 285/315 |
| 2,468,847 | 5/1949 | Trainor | 285/315 |
| 4,036,515 | 7/1977 | Karcher et al. | 285/315 |
| 4,055,359 | 10/1977 | McWethy | 285/39 |
| 4,401,326 | 8/1983 | Blair | 285/321 |
| 4,508,369 | 4/1985 | Mode | 285/39 |
| 4,618,172 | 10/1986 | Becker | 285/319 |
| 4,632,434 | 12/1986 | Proctor et al. | 285/39 |
| 4,691,943 | 9/1987 | Deland et al. | 285/315 |

FOREIGN PATENT DOCUMENTS

152512 8/1985 European Pat. Off. ............. 285/39

*Primary Examiner*—Randolph A. Reese
*Assistant Examiner*—Anthony Knight
*Attorney, Agent, or Firm*—St. Onge Steward Johnston & Reens

[57] ABSTRACT

An improved locking element for a quick-connect coupling is designed for use in joining together tubular fluid conduits. The locking element comprises an annular segment and a plurality of annularly distributed resilient curled fingers which is sized to fit inside an annular cage mounted on one end of an inner coupling. The locking element of the inner coupling engages the flared end of an outer coupling when the couplings are telescopically fitted together.

16 Claims, 1 Drawing Sheet

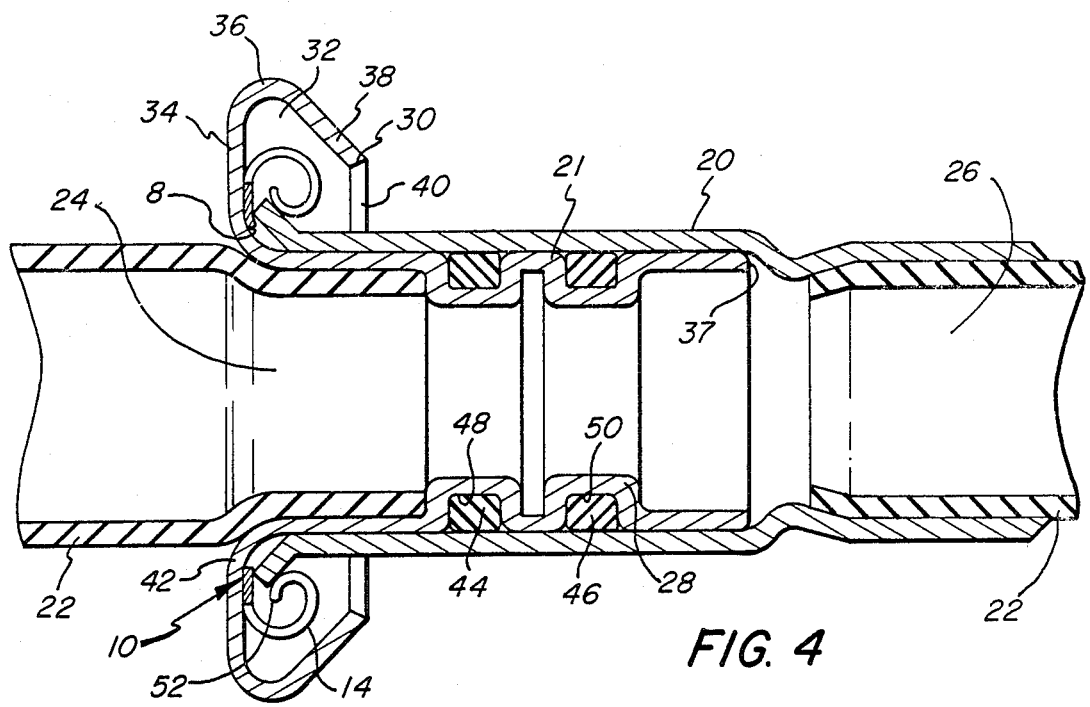
FIG. 4
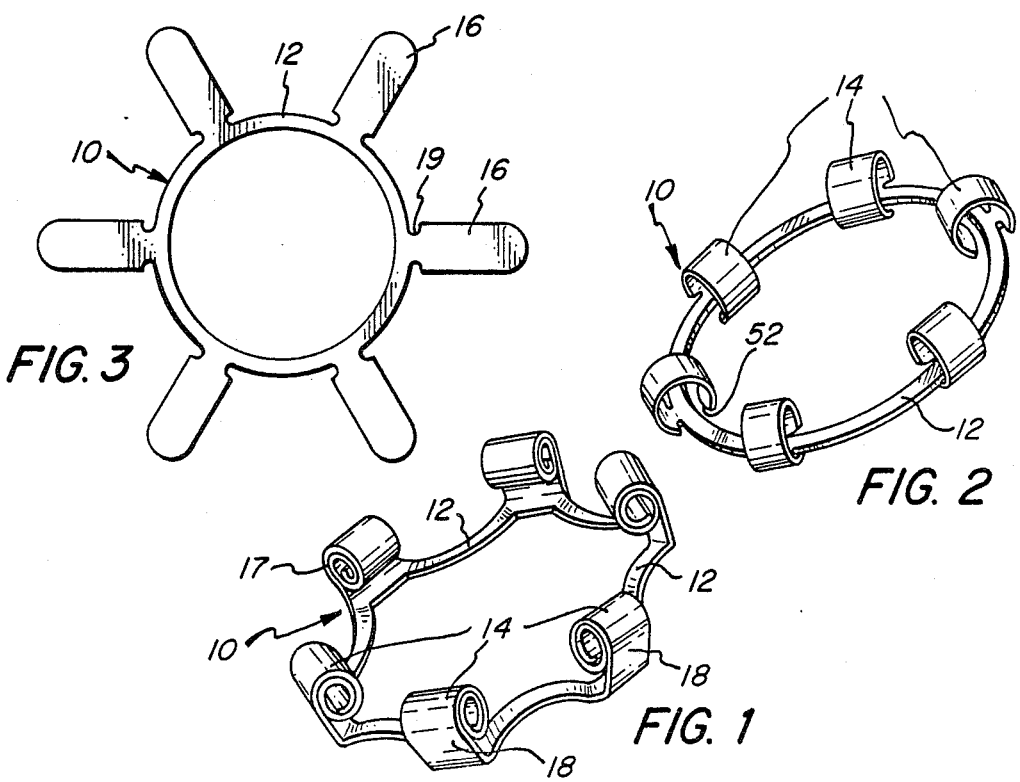
FIG. 3
FIG. 2
FIG. 1

LOCKING ELEMENT

FIELD OF THE INVENTION

The present invention relates to a locking element used in quick-connect couplings for joining tubular fluid conduits such as hydraulic lines in automobiles.

DESCRIPTION OF THE PRIOR ART

The closest known prior art is U.S. Pat. No. 4,055,359 to Irvin E. McWethy for a quick-connect coupling which comprises a tubular male coupling having annular cage means attached to its barrel containing a circular or garter spring. This garter spring consists of a coil spring which has had its ends connected to form it into a toroidal shape. The flared end of a female coupling is engaged by the circular spring when the coupling ends are fitted together. Engagement is effected by pressing the tip of the female coupling into the cage, thereby expanding the garter spring sufficiently to allow the tip to slip inside the spring. The garter spring then rides up around the barrel of the female coupling. Disengagement is prevented because longitudinal forces cause the foared tip to press against the garter spring, which in turn presses against the cage walls.

It has been found in practice however that the circular or garter spring of McWethy '359 is expensive to manufacture, as it requires tightly wound, precisely made coils to fit within the cage means of the McWethy invention.

SUMMARY OF THE INVENTION

It is an object of the present invention to provide a locking element for a quick-connect coupling which avoids the shortcomings of the prior art. More particularly, the present invention provides a locking element for a quick-connect coupling for joining tubular fluid conduits and which is easily and inexpensively manufactured.

One locking element in accordance with the present invention has an annular segment and a plurality of annularly distributed curled fingers which are sized to fit inside an annular cage integrally formed on the peripheral surface of one end of an inner tubular coupling. The annular cage has within it an annular chamber and has an annular opening facing the other end of the inner coupling. The locking element is sized to be pressed into this annular opening and receives the flared end of an outer tubular coupling which also is sized to fit into the annular opening.

The curled fingers of the locking element yield to allow the flared end to pass into the annular cage and seat the annular segment of the locking element against the cage. The curled fingers snap over the flared end and hold the flared end in place.

The quick-connect coupling of the present invention is easily assembled by inserting the barrel of the inner coupling into the flared end of the outer coupling until the flared end of the second coupling enters into the annular cage, and applying sufficient force to cause the curled fingers to yield so that the flared end seats the annular segment of the locking element against the base of the annular cage. The curled fingers then snap back, engaging the flared end. Once joined, the first and second couplings resist disengagement forces caused by fluid pressures inside the tubing and couplings as well as those caused by exterior mechanical forces.

Therefore, the locking element of the present invention represents a substantial improvement over the prior art because it provides for a simple and inexpensive locking element for a quick-connect coupling with no loss in reliability or effectiveness.

Other objects, aspects and features of the present invention in addition to those mentioned above will be pointed out in and will be understood from the following detailed description provided in conjunction with the drawings.

BRIEF DESCRIPTION OF THE DRAWINGS

FIG. 1 is a perspective view of the preferred embodiment of the locking element.

FIG. 2 is a perspective view of another embodiment of the locking element.

FIG. 3 is a plan view of an embodiment of a blank of the locking element.

FIG. 4 is a side elevation view of an assembled quick connect coupling using an embodiment of the locking element.

DETAILED DESCRIPTION OF THE PREFERRED EMBODIMENTS

As shown in FIG. 1 and FIG. 2, the locking element of the present invention, generally indicated as 10 comprises an annular segment 12 and a plurality of annularly distributed resilient curled fingers 14. Locking element 10, as shown in FIG. 3, is punched from a flat sheet of metal into an annular segment 12 with a plurality of between two and eight uniformly distributed, radially outwardly extending flat fingers 16. The width of the fingers may be varied as well. However, the combination of number and width of the curled fingers that provides the most effective locking element is a combination that will provide curled fingers around 25% to 50% of the circumferential length of the annular segment. However, the locking element is effective in the broader range of between 10 and 85% coverage of the circumferential length. In the preferred embodiment, shown as FIG. 1, six fingers are provided which cover 50% of the circumferential length of the fastening element.

The flat fingers are curled into the forms shown in FIGS. 1 and 2 by metal forming techniques which are well known in the art. In the preferred embodiment, shown as FIG. 1, the curled fingers have a double curl 17, as shown in FIG. 1. The double coil curl 17 provides strength, yet the design allows for the flexibility of a thin metal in the upright segment 18. The annular segment 12 may have a substantially hexagonal shape, as in FIG. 1.

The fingers 16 may have notches 19 on either side where they are connected to the annular segment 12 to allow them to be more easily curled, as shown in FIGS. 2 and 3.

In an alternative embodiment of the present invention the flat fingers of the locking element are instead formed with flat fingers extending radially inwardly from the annular segment, instead of radially outwardly as shown in FIG. 2.

Locking element 10 is designed for use with two tubular couplings, shown in FIG. 3 as 20 and 21.

Inner coupling element 21 and outer coupling element 20 are each mounted on tubing 22 by cavities 24 and 26 in each coupling. Inner coupling 21 has a barrel segment 28 and an annular cage 30. The annular cage 30 is located on the peripheral surface of one end of the inner coupling 21 and is integrally formed with the barrel 28. Annular cage 30 defines an annular chamber 32. The cage 30 includes a cage base portion 34, a curved wall 36 and a flange portion 38. The base portion 34 is integral with the barrel 28 and extends radially away from the barrel portion. Curved wall 36 is curved toward the barrel tip 37 which is opposite the end on which the cage 30 is mounted and defines the maximum diameter of the annular chamber and connects to the circular flange 38 which is angled towards the barrel 28. The flange 38 ends in a radial spaced relationship with the peripheral surface of barrel 28 to provide an annular opening 40 around the barrel 28 giving annular access to annular chamber 32.

The annular segment 12 and curled fingers 14 are sized so that they may be pressed into annular chamber 32 through the annular opening 40. Preferably the annular segment 12 will have a diameter slightly less than the maximum diameter of the annular opening 40. The curled fingers 14 add to the diameter of the entire locking element 10 such that the total diameter is greater than the maximum diameter of the annular opening 40, but this does not prevent insertion of the locking element 10 into the annular cage 30 because the curled fingers 14 will yield radially inwardly to allow the locking element 10 to pass into the cage 30.

Once the locking element 10 is inserted into cage 30, the curled fingers 14 spring back to their original shape. While precise tolerances are not critical in this invention, the curled fingers 14 should have sufficient clearance from the walls of the annular chamber 32, and particularly from the flange 38 so that the curled fingers can be expanded when they receive the end 42 of the outer coupling 20.

Inner coupling 21 is telescopically receivable inside outer coupling 20. To insure a safe seal for fluids carried within tubing 22 when the two coupling members are secured, two O-rings 44 and 46 are provided in channels 48 and 50 formed in barrel 28 of inner coupling 18.

Outer coupling 20 is provided with an annular flared end 42 which fits into annular opening 40 and is engaged by the curled fingers 14 when the couplings are telescoped together.

The assembly of couplings 21 and 20 and the connection of the tubes 22 is effected as follows. The tip 37 of the inner coupling 21 is inserted into the flared end 42 of outer coupling 20. As the parts are pressed together, the flared end 42 passes through the annular opening 40 of the inner coupling 21 until flared end 42 presses against the ends 52 of the curled fingers 14. Axial force sufficient to cause the ends 52 to be displaced is then applied so that the flared end 42 can pass by the curled fingers 14 and seat the annular segment 12 adjacent the base portion 34 of cage 30.

The curled fingers 14 then snap over the flared end 42, locking the flared end 42 and the second coupling 20 in place.

The annular cage 30 should provide sufficient clearance such that the curled fingers 14 can be sufficiently displaced to allow the flared end 42 to pass by the curled fingers 14.

The design of the present invention allows the couplings to be engaged with minimal effort, yet be strongly resistant to disengagement. Disengagement is prevented because forces that would tend to separate the couplings are resisted by the spring effect of the curled fingers 32 and further because disengagement forces cause the flared end 42 to press against curled finger 14 which in turn presses against the flange 38, thus resisting separation of the tubes.

The design of and assembly of the components of the present invention enhance the economy with which the component parts of a quick-connect coupling may be made, and provides a secure and reliable tube fastening system which is a substantial improvement over the prior art.

What is claimed is:

1. A locking element for a quick-connect tube coupling formed of an inner tubular element and an outer tubular element, with a barrel segment of the inner tubular element sized for a sealing fit inside the outer tubular element, said inner tubular element having at one end an externally projecting annular cage forming an annular chamber bounded by a flange that extends backwardly towards the other end of said inner tubular element at an angle toward the peripheral surface of said inner tube and terminates at a radial distance from said surface to form an annular cage opening, said outer tubular element having an end that has a peripheral surface that flares outwardly towards said cage and fits through said cage opening and into said cage, comprising:

an annular washer having an annular segment and a plurality of annularly distributed resilient curled fingers extending from said annular segment and said segment and fingers being sized to fit inside said cage with said curled fingers facing backwardly.

2. A locking element in accordance with claim 1, wherein said annular cage is sized so that upon the insertion of said flared end of said outer tube into said cage, said curled fingers may be displaced to allow said flared end to move past said curled fingers to seat said annular segment against said cage, and said curled fingers being sufficiently resilient to snap back to engage said peripheral surface of said flared end to hold said outer tubular element axially in place on said inner tubular element.

3. A locking element in accordance with claim 1 wherein said curled fingers extend radially outwardly from said annular segment.

4. A locking element in accordance with claim 1 wherein said curled fingers extend radially inwardly from said annular segment.

5. A locking element in accordance with claim 1 wherein there are six of said curled fingers.

6. A locking element in accordance with claim 1 wherein said curled fingers comprise 25 to 50% of the circumferential length of said annular segment.

7. A locking element in accordance with claim 1 wherein said curled fingers each comprise an upright segment and a double coil curl.

8. A locking element in accordance with claim 1 wherein said annular segment is substantially hexagonal.

9. A locking element in accordance with claim 1 wherein said curled fingers are substantially circular.

10. A locking element in accordance with claim 1 wherein said curled fingers each comprise a coil having a curvature greater than 360 1 degrees.

11. A locking element for a quick-connect tube coupling formed of an inner tubular element and an outer tubular element, with a barrel segment of the inner tubular element sized for a sealing fit inside the outer tubular element, said inner tubular element having at one end an externally projecting annular cage forming an annular chamber bounded by a flange that extends backwardly towards said barrel segment or the other end of said inner tubular element at an angle toward the peripheral surface of said inner tube and terminates at a radial distance from said surface to form an annular cage opening, said outer tubular element having an end that has a peripheral surface that flares outwardly towards said cage and fits through said cage opening and into said cage, comprising:

an annular washer having an annular segment and six radially outwardly extending annularly distributed resilient curled fingers, each having an upright segment extending from said annular segment and a double coil curl, and said segment and fingers being sized to fit inside said cage with said curled fingers facing backwardly toward said barrel segment.

12. A quick-connect coupling for joining two tubes, comprising:

an inner tubular coupling having a barrel segment sized for sealing fit inside an outer tubular coupling and an externally projecting annular cage integrally formed with said barrel segment at one end thereof, said annular cage having an annular chamber bounded by a flange that extends toward the other end of said barrel at an angle towards the peripheral surface of said barrel and terminates at a radial distance from said surface to form an annular cage opening facing said other barrel end, and mounted within said annular cage a locking element having an annular segment and a plurality of annularly distributed resilient curled fingers extending radially outwardly from said annular segment and being sized to fit inside said cage with said curled fingers facing said other barrel end such that when the flared end of an outer tubular coupling is inserted into said annular opening said curled fingers are displaced to allow said flared end to move past said curled fingers and seat said annular segment against said cage, said fingers being sufficiently resilient to snap back to engage the peripheral surface of said flared end to hold said outer tubular coupling axially in place on said inner tubular coupling.

13. A quick-connect coupling in accordance with claim 12 wherein said locking element has six curled fingers.

14. A quick-connect coupling in accordance with claim 12 wherein said curled fingers comprise between 25 to 50% of the circumferential length of said annular segment.

15. A locking element in accordance with claim 12 wherein said curled fingers are substantially circular.

16. A locking element in accordance with claim 12 wherein said curled fingers each comprise a coil having a curvature greater than 360 degrees.

* * * * *